United States Patent [19]

Inoue et al.

[11] 4,294,520
[45] Oct. 13, 1981

[54] ELECTROCHROMIC DISPLAY DEVICE

[75] Inventors: Eiichi Inoue, Tokyo; Isamu Shimizu, Yokohama; Makoto Shizukuishi, Kamakura, all of Japan

[73] Assignee: Fuji Photo Film Co., Ltd., Minami-ashigarah, Japan

[21] Appl. No.: 73,032

[22] Filed: Sep. 6, 1979

[30] Foreign Application Priority Data

Sep. 6, 1978 [JP] Japan ................. 53-110171

[51] Int. Cl.³ ........................................... G02F 1/17
[52] U.S. Cl. ............................................ 350/357
[58] Field of Search ................... 350/357; 252/408

[56] References Cited

U.S. PATENT DOCUMENTS

| | | | |
|---|---|---|---|
| 3,521,941 | 7/1970 | Deb et al. | 350/357 |
| 4,013,343 | 3/1977 | Jacard et al. | 350/357 |
| 4,060,311 | 11/1977 | Green | 350/357 |
| 4,106,862 | 8/1978 | Bayard | 350/357 |

FOREIGN PATENT DOCUMENTS 52-73749  6/1977  Japan ................. 350/357

*Primary Examiner*—James W. Davie
*Attorney, Agent, or Firm*—Sughrue, Mion, Zinn, Macpeak & Seas

[57] ABSTRACT

An electrochromic display device with an improved current efficiency as well as with an extensive memory capability is disclosed; the device comprises a vapor deposited layer of an electrochromic material and a contiguous layer comprising chromium (III) oxide and the oxide of a transition metal or silicon also formed by vapor deposition. These two layers are sandwiched between a pair of electrodes at least one of which is light-transmitting.

12 Claims, 2 Drawing Figures the display part of the electrochromic display devices constructed in accordance with the instant invention which comprise a transparent support 10, a transparent electrode 11, a vapor deposited layer of $WO_3$ 12, a second vapor deposited layer comprising chromium (III) oxide and an oxide of a transition metal or of silicon in a mixed state 13 and a counter electrode 14.

ELECTROCHROMIC DISPLAY DEVICE

BACKGROUND OF THE INVENTION

1. Field of the Invention

This invention relates to an electro-optical display device.

2. Description of Prior Art

A number of display devices operated by an electric field have been developed, including those based on the electrochromic phenomenon. One typical example is set forth in British Pat. No. 1,186,541 and U.S. Pat. No. 3,521,941 which comprises a pair of electrodes at least one of which is optically transparent between which are disposed an electrochromic layer containing the oxide of a transition metal or copper and an insulating intermediate layer capable of transmitting the electric charge carrier therethrough. Such a device operates by altering its electromagnetic absorption characteristics in response to an electric signal thus developing or erasing color. The devices set forth in the above-cited patents specify a single component in each of the electrochromic and insulating layers.

Japanese Patent Application (OPI) Nos. 87343 to 87347/1975 describe a variety of display devices also based on electrochromism wherein the following, various layer arrangements are disclosed. A layer comprising two or more transition metal compounds superposed with a layer of an electrolyte, a single layer structure containing both of the transition metal compound and the electrolyte dispersed therein; a double layer structure comprising a layer containing a metal oxide together with a metal and an electrolyte layer; a single layer structure containing two or more of transition metal compounds and an electrolyte, a liquid electrolyte layer, a layer comprising a porous material containing electrolytes, etc.

Furthermore, Japanese Patent Application (OPI) NO. 73749/1977 discloses a double layer structure comprising an electrolytically reducible chromogenic thin layer and an electrolytically oxidizable thin layer disposed between a pair of electrodes. Each of these electrochromic display devices has a common shortcoming. With repeated color development and erasing color reversibility deteriorates, and seriously limits the life of the display device. Accordingly, such display devices have been regarded as inadequate and unreliable. On the other hand, the so-called memory effect, i.e., the ability to retain the once developed color for an extended period, as is well known, is rather poor. Another disadvantage of such devices is that a relatively high operating level of current density is required to maintain the colored state unchanged.

SUMMARY OF THE INVENTION

The object of the instant invention is to provide an electro-optical display device free from the above-described disadvantages inherent to conventionally known devices.

Related objects of the present invention are to provide a display device, first with improved reliability, second with improved memory effect of long duration, and third with an improved current efficiency in the retention of the colored state.

As a result of the extensive investigations it has been found that with an electrochromic display device constructed by vapor depositing on a transparent electrode a layer of an electrochromic substance, then superposing on that a layer a second vapor deposited layer comprising a mixture of chromium (III) oxide and the oxide of a transition metal or of silicon, and by providing a counter electrode, the objects of the present invention are achieved utilizing the desirable electrochromic features of known electrochromic substances such as tungsten trioxide and chromium (III) oxide; though the definite mechanism of the electrolytic reaction taking place in the construction of the instant invention has not yet been clarified.

BRIEF DESCRIPTION OF THE DRAWINGS

FIGS. 1 and 2 illustrate the cross-sectional views of

DETAILED DESCRIPTION OF THE INVENTION

Transparent electrodes suitable for use in the present invention include those prepared by providing on a transparent substrate such as glass, plastic, etc., an electro-conductive thin transparent coating comprising indium oxide, tin oxide, etc. a semi-transparent coating comprising copper iodide, CdO, $SnCd_xO_y$ (x:1.5–2.5, y:0.5–1.5, e.g., $SnCd_2O$), or a semi-transparent metal film such as Au, Pt, Ni, etc. The surface resistivity of the transparent electrode should not be more than 100 $K\Omega/\square$ and preferably not more than 100 $\Omega/\square$ and the transmittance should be 30% or more, preferably 70% or more.

The electrochromic layer can be prepared by depositing on one of the above-described transparent electrodes a suitable electrochromic substance such as tungsten trioxide vaporized from a vapor source. Preferably electrochromic substances include tungsten trioxide, molybdenum trioxide, mixtures thereof, etc. The electrochromic layer is about 0.1 to 10$\mu$ and preferably 0.3 to 2$\mu$ thick.

The second vapor deposited layer can be provided on the first layer by carrying out vapor deposition with the use of a single vapor source containing $Cr_2O_3$ and the oxide of a transition metal or silicon, or multiple sources each containing one of the ingredients cited above. The second deposited layer consists of a mixture of $Cr_2O_3$ and the oxide of a transition metal or of silicone since they have been simultaneously evaporated and deposited. This layer is usually deposited in a thickness of about 500 Å to 10$\mu$ and preferably 0.1 to 10$\mu$. The order of the two layers may be reversed.

A variety of transition metal oxides can be used in the present invention, including $V_2O_5$, $TiO_2$, $ZrO_2$, $Nb_2O_5$, $Ta_2O_5$, etc., while the oxide of silicon is SiO.

The counter electrode can be formed of, for example, a thin metal coating, an electrically conductive resin, or an electro-conductive paste. In addition, Pt, CdO, $SnCd_xO_y$ (x:1.5–2.5, y:0.5–1.5), $In_2O_3$, $SnO_2$, etc. may also be used as the counter electrode.

Figure 1:
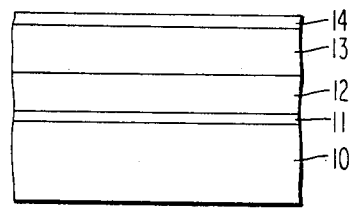
Figure 2:
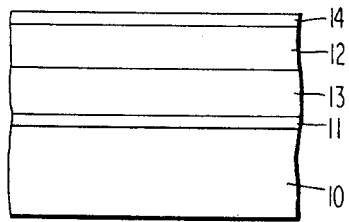

The image display part of the display device thus constructed is schematically illustrated in FIGS. 1 and 2. In the figures, 10 is a transparent substrate, 11 a transparent electrode, 12 a vapor deposited layer of tungsten trioxide, 13 a second vapor deposited layer comprising chromium (III) oxide and the oxide of a transition metal or silicon and 14 a counter electrode, respectively.

The transition metal oxide or silicon oxide simultaneously vapor deposited with chromium (III) oxide should have a high affinity for chromium (III) oxide or be compatible therewith. Further, mixing ratios with good compatibility between these components should be selected in order to prevent the resulting vapor deposited layer from becoming non-uniform. While suitable ratio's depend on a number of factors, generally the transition metal and/or silicon oxide is present in an amount of 5 to 80%, preferably 40 to 50%, of the deposited layer.

The method of forming the inorganic layers characterizing the instant invention is not limited to thermal evaporation, but conventional means such as sputtering and ion plating can also be employed. For example, to provide a mixed layer comprising chromium (III) oxide and vanadium oxide, one can use electron beam plating using, as a vaporization source, a mixed product prepared by sintering in air chromium (III) oxide mixed with $V_2O_5$ in a weight ratio of from about 1:1 to 1:0.3. The resulting device operates quite favorably. Alternatively, desirable devices have been produced by separately evaporating chromium (III) oxide using an electron beam, and $V_2O_5$ by ordinary heating in a thermal boat to provide a mixed layer on the substrate so long as the mixing ratio is within the range cited above. With higher contents of $V_2O_5$ exceeding the cited mixing ratio, the conductivity of the layer becomes undesirably high, while with lower contents outside the cited mixing ratio the performance of the device resembles the layer consisting of pure chromium (III) oxide, also deviating from the optimum condition. The suitable layer growth rate lies between 3 and 8 Å/sec in consideration of the decomposition of $V_2O_5$ which increases with oxygen pressure. Higher substrate temperatures (up to 250° C. and preferably 100° to 200° C.) are generally preferred since the stability of the resulting layer and the performance as display device both improve.

In the case where silicon oxide is co-deposited with chromium (III) oxide, contents of silicon oxide below about 10% by weight proved to give preferable performances as electrochromic display device.

The electrochromic display device of the present invention may be used in a conventional manner. The voltage applied to the device is not critical, 1 to 3 V is adequate. Since the current varies as a function of time it is not defined but the initial current may be 100 $\mu A/cm^2$, preferably 10 to 100 $\mu A/cm^2$.

Hereafter, some practical examples of the instant invention will be described for better understanding of the invention.

EXAMPLE 1

A transparent electrode plate was prepared by depositing on a glass plate having a 1 mm thickness, $In_2O_3$ mixed with 5% by weight of $SnO_2$ via electron beam plating under $5 \times 10^{-5}$ torr to give a coating thickness of about 600 Å, and then heat-treating the product in oxygen at 450° C. for 30 minutes. The surface resistivity of the thus provided transparent electrode was 220 $\Omega/\square$, and the transmittance was 80% at 633 nm λ. After ultrasonic cleaning in ethanol and then in an alkaline detergent, the transparent electrode plate was subjected to electron beam plating with $WO_3$ of 99.9% purity under a vacuum of $7 \times 10^{-6}$ torr. The thickness of the $WO_3$ layer was about 3000 Å thick. Then the plate was further subjected to electron beam plating with the use of vaporization source material in pellet form comprising equal weight of $Cr_2O_3$ of four nine grade and $V_2O_5$ of three nine grade under a vacuum of $6 \times 10^{-4}$ torr. The thickness of the deposited layer was about 3200 Å. Finally, a gold layer was superimposed on the $Cr_2O_3/V_2O_5$ layer by electron beam plating of a four nine grade raw material to give a thickness of about 300 Å under a vacuum of $3 \times 10^{-6}$ torr.

The performance (coloration/erasure) test of the thus prepared electrochromic display device was carried out by keeping the transparent electrode at ground potential and applying negative or positive potentials relative to the gold electrode. As a comparative device, a conventionally known display was tested in which a 3000 Å thick $Cr_2O_3$ layer was used in place of the above-described $Cr_2O_3/V_2O_5$ layer.

When 1.5 V was applied between the electrodes so that the gold electrode became positive, the transmitting density rose to 0.76, which density could be sustained with a current density of only about 0.2 mA (The current saturated at this value and higher currents did not flow.). After the current was cut, a half-decay density was reached in 2 to 3 hours (a period indicative of spontaneous erasure).

On the other hand, the comparative device in which a $Cr_2O_3$ layer replaced the $C_2O_3/V_2O_5$ layer developed a transmitting density of about 0.4 to 0.7 with the application of 1.0 to 2.0 volts. However, about 20 to 40 mA current was required to maintain this density, while after the termination of current supply the color erased spontaneously in only 13 seconds.

EXAMPLE 2

The pellet comprising $Cr_2O_3$ and $V_2O_5$ in the previous example was replaced with another pellet comprising 9 parts by weight of four nine grade $Cr_2O_3$ and 1 part by weight of three nine grade SiO. By forming a layer of about 1000 Å thickness and repeating the same procedures described in Example 1, an electrochromic display device was constructed. This device was characterized by a capability for dense image formation (density=1.39). The image once formed lasted for several days after the termination of current supply.

EXAMPLE 3

A powder comprising 9:1 in weight mixture of $WO_3$ and $MoO_3$ was processed to give a disk of 5 mm thickness and 85 mm diameter by hot-press. This disk was subjected to sputtering under an atmosphere of $5 \times 10^{-2}$ torr argon gas containing 5% oxygen and deposited onto the conductive surface of a $In_2O_3$ coated glass (the surface resisitivity of which was 10 $\Omega/\square$.) to provide a 4000 Å thick coating comprising $WO_3$ and $MoO_3$. The high frequency energy was about 100 W and the support was not heated intentionally. As in Example 1, another layer was superimposed on the $WO_3/MoO_3$ layer comprising $Cr_2O_3$ and $V_2O_5$ with a 3000 Å thickness, and finally a gold counter electrode with 300 Å was provided. The results of coloration and erasure test were as follows.

A transmitting density of 0.85 was developed with 1.5 V, this density was sustained with only 0.1 mA current, and the half-decay time was about 4 hours.

While the invention has been described in detail and with reference to specific embodiments thereof, it will be apparent to one skilled in the art that various changes and modifications can be made therein without departing from the spirit and the scope thereof.

What is claimed is:

1. An electrochromic display device comprising a transparent electrode, a laminate structure provided on said electrode comprising a vapor deposited layer of an electrochromic substance and a second vapor deposited mixed layer of chromium (III) oxide and an oxide selected from the group consisting of a transition metal oxide and silicon oxide and a counter electrode provided on said laminated structure wherein said oxide is present in an amount of 5 to 80% of said second vapor deposited mixed layer.

2. The display device of claim 1, wherein said transparent electrode comprises a transparent support having deposited thereon an electrically conductive transparent coating.

3. The display device of claim 2, wherein said electrically conductive transparent coating is comprised of a material selected from the group consisting of indium oxide, tin oxide, and copper iodide.

4. The display device of claim 1, wherein said electrochromic substance is tungsten trioxide, molybdenum trioxide, or mixtures thereof.

5. The display device of claim 1, wherein said second vapor deposited mixed layer is a layer of chromium (III) oxide and a transition metal oxide.

6. The display device of claim 1, wherein said second vapor deposited mixed layer is a layer of chromium (III) oxide and silicon oxide.

7. The display device as claimed in claim 5, wherein said transition metal oxide is selected from the group consisting of $V_2O_5$, $TiO_2$, $ZrO_2$, $Nb_2O_5$ and $Ta_2O_5$.

8. The display device of claim 7, wherein said transition metal oxide is vanadium oxide or titanium dioxide.

9. The display device of claim 8, wherein said transition metal oxide is $V_2O_5$.

10. The display device of claim 9, wherein said the weight ratio of chromium (III) oxide to $V_2O_5$ is about 1:1 to 1:0.3.

11. The display device of claim 1, wherein said counter electrode is gold.

12. The display device as claimed in claim 6, wherein said silicon oxide is present in an amount of about 10% by weight or less of said second vapor deposited mixed layer.

* * * * *